US010295843B2

(12) United States Patent
Bergner

(10) Patent No.: US 10,295,843 B2
(45) Date of Patent: May 21, 2019

(54) FRAMELESS SAFETY EYEGLASSES HAVING CORRECTIVE EYEGLASS LENSES AND LATERAL PROTECTIVE PARTS

(71) Applicant: Walter Bergner, Bad Kreuznach (DE)

(72) Inventor: Walter Bergner, Bad Kreuznach (DE)

( * ) Notice: Subject to any disclaimer, the term of this patent is extended or adjusted under 35 U.S.C. 154(b) by 0 days.

(21) Appl. No.: 15/316,715

(22) PCT Filed: Jun. 3, 2015

(86) PCT No.: PCT/DE2015/100220
§ 371 (c)(1),
(2) Date: Dec. 6, 2016

(87) PCT Pub. No.: WO2015/188807
PCT Pub. Date: Dec. 17, 2015

(65) Prior Publication Data
US 2017/0146830 A1    May 25, 2017

(30) Foreign Application Priority Data

Jun. 10, 2014   (DE) .................... 20 2014 102 682 U

(51) Int. Cl.
| | |
|---|---|
| *G02C 11/00* | (2006.01) |
| *G02C 1/02* | (2006.01) |
| *G02C 5/02* | (2006.01) |
| *G02C 5/22* | (2006.01) |

(52) U.S. Cl.
CPC ................ *G02C 11/12* (2013.01); *G02C 1/02* (2013.01); *G02C 5/02* (2013.01); *G02C 5/22* (2013.01)

(58) Field of Classification Search
CPC . G02C 11/12; G02C 5/22; G02C 1/02; G02C 5/02

USPC .................................................. 351/41, 110
See application file for complete search history.

(56) References Cited

U.S. PATENT DOCUMENTS

| | | | |
|---|---|---|---|
| 1,323,805 A | 12/1919 | Gay | |
| 2,840,821 A | 7/1958 | Gay et al. | |
| 3,577,566 A | 5/1971 | Kislin | |
| 5,748,280 A * | 5/1998 | Herman | G02C 1/02 351/106 |
| 9,429,773 B2 * | 8/2016 | Ben-Shahar | G02C 5/001 |

FOREIGN PATENT DOCUMENTS

WO    2010/055732    5/2010

OTHER PUBLICATIONS

International Search Report for International PCT Application No. PCT/DE2015/100220.

* cited by examiner

*Primary Examiner* — Tuyen Tra
(74) *Attorney, Agent, or Firm* — Hauptman Ham, LLP

(57) ABSTRACT

The invention relates to safety eyeglasses, in particular working safety eyeglasses or sports safety eyeglasses, having corrective eyeglass lenses for compensating defective vision, the safety eyeglasses comprising lateral protective parts (3) and eyeglass temples (5), wherein the safety eyeglasses (1) are designed as frameless eyeglasses and the corrective lenses (2) are designed as plastic lenses, which are rigidly connected to lateral protective parts (3) to be attached temporally, wherein the lateral protective parts (3) are integrally formed on the corrective lenses in an accurately fitting manner in the connection region to the corrective lenses (2) such that the curve course of the corrective lenses is reproduced by the lateral protective parts (3) in the connection region.

14 Claims, 1 Drawing Sheet

Figure 1:
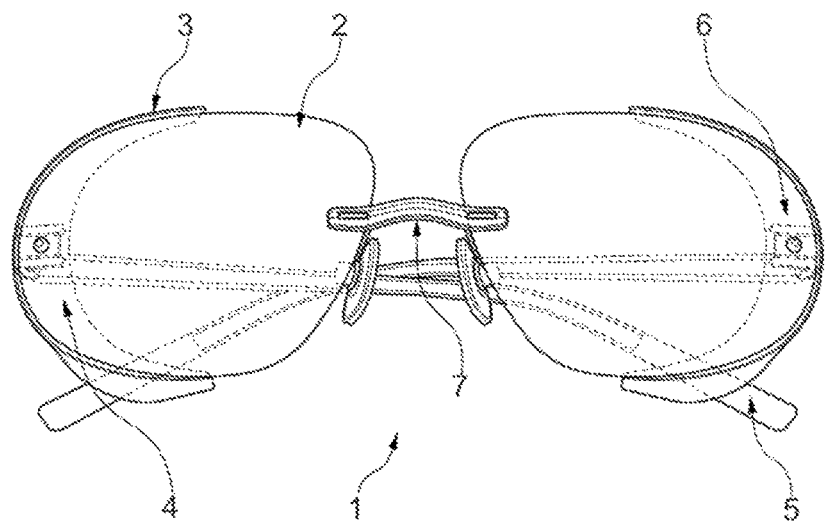

FRAMELESS SAFETY EYEGLASSES HAVING CORRECTIVE EYEGLASS LENSES AND LATERAL PROTECTIVE PARTS

The invention relates to safety glasses, in particular work safety glasses or sports safety glasses, with corrective safety-eyeglass lenses for correcting ametropia, according to the preamble of claim 1.

In the prior art, safety glasses that typically have frames of plastics material or metal, into which the corrective eyeglass lenses or protective lenses are inserted are known, on the one hand. Said safety glasses are centrically connected by way of a nose bridge. The arms in the temporal region are connected to the spectacle frame in a fixed manner or by hinges, and in this way effect a reliable fit on the head of the wearer of glasses.

Moreover, it is known for side protection parts which are to protect the eyes of the wearer of glasses from foreign matter laterally entering the space of the eyes and causing injuries herein to be disposed in a temporal manner on safety glasses. Safety glasses of this type are to be mandatorily worn by employees in particular in the case of activities at machines where shavings and similar fly around. Side protection parts of this type herein are either temporally connected to the spectacle housing in a fixed manner, or are laterally connected to the arms in a fixed manner, wherein said side protection parts in the latter case are moved to the lateral protective position by folding out the arms.

Publications U.S. Pat. Nos. 4,670,915 and 5,032,017, in which arrangements are disclosed in which the eyeglass lenses are either configured in one part or are connected by way of a bridge, wherein arms are directly attached to the eyeglass lenses in a temporal manner, are known as examples of the prior art in terms of frameless safety glasses. In the publications mentioned, the technical benefit lies in that the arms are releasably fastened to the eyeglasses such that a redesign of these glasses is readily possible by way of corresponding refitting.

The arrangement of side protection parts on conventional glasses having frames is also sufficiently disclosed in the prior art. Publications U.S. Pat. No. 5,793,463, US 2003/0 218 716 A1, US 2010/0 296 046 A1, and U.S. Pat. No. 6,393,609 show examples of a universally usable side protection part for glasses, which by way of a central clamping element that engages on the spectacle frame may be clip-fitted onto a conventional spectacle frame, the latter in a manner engaging thereacross carrying side protection parts. Alternatively, the side protection parts are simply clip-fitted to the spectacle frame in a lateral manner.

Lateral side protection parts that each are releasably employable on spectacle housings are disclosed from the publication WO 01/51983 A1, U.S. Pat. Nos. 5,438,706, and 5,543,864. To this end, in a deviating design embodiment, clip-fit mechanisms by way of which the side protection parts are to be releasably fastened to the arms are provided.

German utility model publication DE 19 97 504 U indeed shows a frameless construction; however, these herein are not safety glasses but a clip-on part for spectacles that has side protection parts. This is thus a superimposition of conventional glasses, on account of which significant shortcomings in the application in terms of wear comfort, cleaning, and thus vision are created. The eyeglass lenses used are pure safety eyeglass lenses and not corrective lenses.

Finally, a safety-glasses construction which is assembled from various interconnectable construction elements is known from prescription U.S. Pat. No. 5,379,463. Herein, a planar eye-and-face protection for frontally covering the field of view that is configured in one part and already has a clearance for the nasal bridge is disclosed. Said eye-and-face protection is held by an upper bracket that spans this construction elements, said bracket in turn representing the connection to the lateral wings that in turn already carry the side protection parts.

Against this technical backdrop, it is an object of the present invention to provide safety glasses, in particular work safety glasses or sports safety glasses, according to the preamble of claim 1, which comprise both corrective eyeglass lenses as well as side protection parts, but herein are constructed in a frameless manner, wherein a particularly lightweight construction is targeted.

This is achieved according to the invention by safety glasses, in particular work safety glasses or sports safety glasses, according to the characterizing features of claim 1.

The dependent claims have the subject matter of advantageous design embodiments of the invention.

The fundamental concept in the design of the safety glasses according to the invention is for the glasses to do without an encompassing frame of plastics material or metal. To this end, the corrective eyeglass lenses are made from plastics material and are suitable for frameless glasses. Herein, the eyeglass lenses may already be configured as one contiguous body, or alternatively may be connected in a nasal manner by a bridge which is screwed, adhesively bonded, or welded to the eyeglass lenses.

As opposed to the solutions listed in the prior art, in each case one side protection part is connected in a temporal manner to the eyeglass lenses, wherein the side protection parts likewise are composed of a specially shaped transparent plastics material, and at the peripheries are screwed, adhesively bonded, or welded, to the eyeglass lenses. Herein, it is a central aspect of the invention, that the regions between the eyeglass and the side protection part that bear, abut, or lie on one another are designed in such a manner that the curved profiles of the eyeglass lenses are received by the side protection parts such that a connection with an exact fit and optionally without a gap may be produced.

There are a plurality of options for disposing arms for fastening the glasses to the head of the wearer of glasses. The arms may either be fastened to the corrective lenses or to the side protection parts, or alternatively by way of the respective fastening joint be fastened both to the eyeglass as well as to the side protection part, wherein a screw connection, an adhesive connection, or a welded connection may be provided as fastening. An articulated hinge may be provided herein for the arm. The hinge part for the arm herein may be disposed so as to bear externally or internally on the side protection part.

A screw connection of the hinge element may expediently also be performed only on the side protection parts.

Alternatively, however, a bore for a screw connection, that runs both in the side protection part as well as in the eyeglass, may also be disposed in an overlap region.

Alternatively, the hinge for disposing an arm may likewise already be a constructive component of the side protection part.

Manufacturing to an exact fit may be facilitated in that a corresponding step is molded in the material of the side protection part in such a manner that this step in the profile thereof and the shaping thereof mirrors in an exactly fitting manner the external contour and curvature of the peripheral region of the eyeglass that is to be received by this depression. This has advantages in the manufacturing of the safety glasses, since the positioning of the side protection part in relation to the eyeglass is simplified on account thereof.

One further advantageous refinement lies in that the side protection parts are identically configured and may be used for either side. The advantage is that said side protection parts are now capable of being installed in an arbitrary manner on the left as well as on the right side, and additionally may be produced using one tool, meaning a significant saving in costs. To this end, a special shaping of the corrective lenses and of the side protection parts in the connection regions thereof is provided such that the corrective lenses on the left as well as on the right are connectable to the identically configured side protection part so that attaching to the corrective lenses is feasible on both sides.

Figure 2:
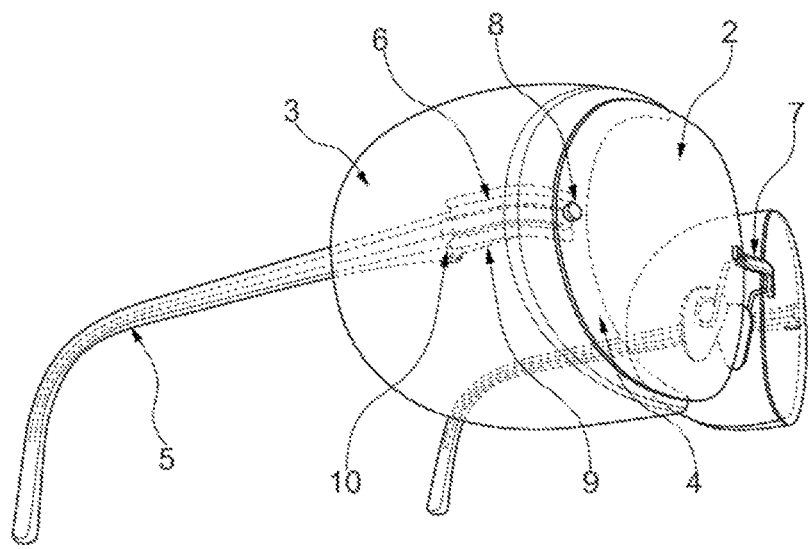

An advantageous construction embodiment of the safety glasses according to the invention is explained in more detail hereunder by means of two drawings in which FIG. 1 shows the safety glasses 1 according to the invention in a front view, having folded-in arms 5; and FIG. 2 shows the safety glasses 1 according to the invention in a perspective lateral view onto the side protection part 3 having folded-out arms 5.

A design embodiment of the invention that is composed of two corrective lenses 2 as eyeglass lenses, which are interconnected by a centrically disposed nose bridge 7, is illustrated in a front view in FIG. 1. Fastening of the nose bridge 7 herein is performed directly into the plastics material lenses of the corrective lenses 2.

The connection between the corrective lenses 2 and the side protection part 3 herein is illustrated as a dashed line. The connection region between the corrective lens 2 and the side protection part 3 herein follows the external contour of the corrective lens 2. In this way, the side protection part 3 and the eyeglass 2 may bear in a planar manner on one another in an overlap region 4, this substantially improving the stability of the connection between the corrective lens 2 and the side protection part 3.

However, alternative construction embodiments in which the corrective lens 2 and the side protection part 3 are interconnected, for example adhesively bonded, in a squarely abutting manner, are also provided. A groove-type connection may be performed herein in the connection region. Moreover, the connecting function of the hinge part 6 herein may act in a stabilizing manner, to the extent that said hinge part 6 is connected to the eyeglass 2 and to the side protection part 3, for example.

In the present construction embodiment, a screw connection of these two components is established by a fastening screw 8 which in the overlap region 4 runs between the corrective lens 2 and the protection part 3. In the present construction embodiment, this screw connection is additionally performed into the hinge part 6 that supports the arm 5.

This is highlighted in particular again in FIG. 2. A hinge body 6, having an approximate l-shape, runs from the overlap region 4 of the corrective lens 2 and the protection part 3, so as to follow the contour of the protection part 3, up to approximately the central region of the side protection part 3. In the present construction embodiment, the hinge body 6 is connected in a frontal manner by way of the fastening screw 8 to the components being the corrective lens 2 and the protection part 3, on the one hand. Moreover, an additional adhesive connection or welded connection to these components is expedient.

Moreover, in the present construction embodiment, guide strips 9 are disposed internally on the side protection part 3 so as to be above and below the side protection part 3 in such a manner that these guide strips 9 serve for aligning and disposing the hinge body 6. On account thereof, positioning of the hinge body 6 on the side protection part 3, on the one hand, as well as the stability of the fastening of the hinge body 6 is facilitated. At the end thereof, the hinge body 6 has the articulated connection 10 to the arm 5.

On account thereof, advantageous safety glasses 1 are produced which are configured as an integral body without a spectacle frame, wherein the elementary construction elements of the eyeglass lenses 2, of the side protection parts 3, as well as of the arms 5 are fixedly interconnected.

LIST OF REFERENCE SIGNS

1 Safety glasses
2 Corrective lens
3 Side protection part
4 Overlap region of corrective lens and protection part
5 Arm
6 Hinge body
7 Nose bridge
8 Fastening screw
9 Guide strips
10 Articulated connection

The invention claimed is:

1. Safety glasses with corrective safety-eyeglass lenses for correcting ametropia, comprising side protection parts and arms,
wherein
the safety glasses are configured as frameless glasses,
wherein the corrective lenses are configured as plastics material lenses which are fixedly connected to side protection parts that attach in a temporal manner, and the corrective lenses in an overlap region bear in a planar manner on the side protection parts that are molded in an exact fit, and in this connection region are adhesively bonded and/or welded and/or screwed to the side protection parts,
wherein the side protection parts in the connection region to the corrective lenses are molded to the latter in an exact fit such that the curved profile of the corrective lenses is mirrored by the side protection parts in the connection region.

2. The safety glasses as claimed in claim 1,
wherein
the corrective lenses in the nasal region are connected by a nose bridge which is adhesively bonded and/or welded and/or screwed so as to be fixed to the plastics material lenses.

3. The safety glasses as claimed in claim 1,
wherein
the corrective lens and the side protection part in the temporal connection region are configured so as to squarely abut one another, and in this region are adhesively bonded and/or welded to one another.

4. The safety glasses as claimed in claim 1,
wherein
the side protection part and/or the corrective lens in the overlap region have/has a graduation which effects a connection by way of an exact fit of these components in this connection region.

5. The safety glasses as claimed in claim 1,
wherein
the side protection part and the corrective lenses in the lateral connection regions thereof are configured in such a manner that the side protection part in only one construction embodiment is laterally attachable to the two corrective lenses, and thus both side protection parts are identically configured.

6. Safety glasses with corrective safety-eyeglass lenses for correcting ametropia, comprising side protection parts and arms,
wherein
the safety glasses are configured as frameless glasses,
the corrective lenses are configured as plastics material lenses which are fixedly connected to side protection parts that attach in a temporal manner,
the side protection parts in the connection region to the corrective lenses are molded to the latter in an exact fit such that the curved profile of the corrective lenses is mirrored by the side protection parts in the connection region, and
a hinge element is disposed internally or externally on the side protection part, and is welded and/or adhesively bonded and/or screwed to the latter.

7. The safety glasses as claimed in claim 6,
wherein
at least one guide strip on which the hinge element bears is disposed at least in the side protection part.

8. The safety glasses as claimed in claim 7,
wherein
the hinge element is guided between two guide strips so as to be disposed internally on the side protection part, and is adhesively bonded and/or welded and/or screwed to the latter.

9. The safety glasses as claimed in claim 6,
wherein
at least one bore runs in the connection region of the corrective lens and the side protection part, by way of which bore the components of the corrective lens, of the side protection part, and of the hinge element are interconnected by one fastening screw.

10. The safety glasses as claimed in claim 6,
wherein
the corrective lenses in an overlap region bear in a planar manner on the side protection parts that are molded in an exact fit.

11. The safety glasses as claimed in claim 6,
wherein
the side protection part and the corrective lenses in the lateral connection regions thereof are configured in such a manner that the side protection part in only one construction embodiment is laterally attachable to the two corrective lenses, and thus both side protection parts are identically configured.

12. Safety glasses with corrective safety-eyeglass lenses for correcting ametropia, comprising side protection parts and arms,
wherein
the safety glasses are configured as frameless glasses,
the corrective lenses are configured as plastics material lenses which are fixedly connected to side protection parts that attach in a temporal manner,
the side protection parts in the connection region to the corrective lenses are molded to the latter in an exact fit such that the curved profile of the corrective lenses is mirrored by the side protection parts in the connection region, and
a hinge element or an articulated connection is a constructive component part of the side protection part.

13. The safety glasses as claimed in claim 12,
wherein
the corrective lenses in an overlap region bear in a planar manner on the side protection parts that are molded in an exact fit.

14. The safety glasses as claimed in claim 12,
wherein
the side protection part and the corrective lenses in the lateral connection regions thereof are configured in such a manner that the side protection part in only one construction embodiment is laterally attachable to the two corrective lenses, and thus both side protection parts are identically configured.

* * * * *